Patented May 15, 1923.

UNITED STATES PATENT OFFICE.

HENRY V. HALEY, OF OKLAHOMA, OKLAHOMA, ASSIGNOR TO INTERNATIONAL COTTON PROTECTING COMPANY, OF DOVER, DELAWARE, A CORPORATION OF DELAWARE.

COTTON BALE AND MATERIAL AND METHOD FOR RENDERING THE SAME PROOF AGAINST FIRE AND COUNTRY DAMAGE.

No Drawing. Application filed December 4, 1920. Serial No. 428,279.

*To all whom it may concern:*

Be it known that I, HENRY V. HALEY, a citizen of the United States, residing at Oklahoma city, in the county of Oklahoma and State of Oklahoma, have invented a new and useful Improvement in Cotton Bales and Materials and Methods for Rendering the Same Proof Against Fire and Country Damage, of which the following is a specification.

The present invention relates to baled cotton which is permanently proof against flash and spark fires and country damage and to materials and processes for treating baled cotton to effect these results.

In accordance with the present invention a treated bale of cotton may be made permanently proof against flash and spark fires and country damage proof by superficially impregnating it with a suitable solution of the character hereinafter more fully set forth. The impregnation may be effected by complete or partial submersion of the bale being treated, or by spraying, or the like. In commercial practice complete submersion has been found impracticable, by reason of the great buoyancy of baled cotton. It is preferred that the impregnation be effected by dipping or partially submerging its sides and ends into a relatively shallow layer of liquid. Spraying has been found advantageous where only small areas of the surface of a bale are to be treated, as, for example, in retreating areas of a bale from which samples have been taken, or the surface layers of which have been removed or torn in handling. After treatment the bale is permitted to dry.

The solution employed in accordance with the present invention is effective in making the bale of cotton treated proof against flash and spark fires and against country damage, this being effected without injuring the cotton, lessening its tensile or spinning strength, or affecting the action of dyeing and bleaching agents upon it. By "country damage" is meant the deterioration of the cotton, owing to fermentation, fungous growth, and the like, to which cotton is subject under conditions of dampness and lack of circulation of fresh air.

The treating solution is preferably prepared by solution in water of a paste into which the ingredients are incorporated. In order to prepare this paste a boric acid containing a trace of mineral acid is first prepared, preferably by treatment of borax with sulfuric acid. A saturated solution of borax is treated with an excess of sulfuric acid and the resulting pulverulent boric acid is washed with water, the washing being discontinued while the wash water still has an acid reaction. This boric acid, containing a trace (less than 0.1%) of the mineral acid, is then made into a paste with one-half its weight of water, in which a non-coloring fixing agent has been dissolved. Boric acid substantially free from mineral acid may likewise be employed. As such fixing agent I may employ a soluble salt of zinc, tin, aluminum or other suitable metal, or mixtures thereof. For example, a mixture of zinc and stannous sulfates in equal proportions may be employed. The quantity of fixing agent employed may suitably be 0.5% of the total weight of the paste, although other proportions may be used. Thus satisfactory results may be obtained by the use of 0.25% of the fixing agent, or by the use of higher proportions, up to, say 1.5%.

In preparing the solution for the treatment of the cotton bales, the above paste is dissolved in water, a suitable proportion being 1 pound of paste to 12-1/2 gallons of solution. The proportion of paste to solution may be varied at will, and may be either more or less than as specifically stated. The proportion of paste to solution will likewise be varied in case the paste is made of a different concentration than hereinbefore described. The solution resulting from the use of the paste as specifically described hereinbefore, made up in the proportion of 1 pound of paste to 12-1/2 gallons of solution, will contain 2-2/3 pounds of boric acid, 1/25th pound of fixing agent or agents per 100 gallons, and will contain a trace of sulfuric acid.

A bale of cotton, treated with solution in accordance with this invention, is impregnated to a depth of 3/4 inch to 4 or 5 inches, the depth varying with the varying compression of the cotton at varying points, by the presence or absence of bagging or burlap on the surface of the bale, and by the factors not now known in their entirety. The impregnation is substantially permanent, and the treating materials are not removed by rain, snow or by the ordinary circumstances to which the bale may be subjected. There is no deterioration of the cotton, nor is its conduct under the ordinary treatment of bleaching and dyeing affected.

Although the present invention has been described in connection with the specific details of examples of compositions and methods for use in carrying it into effect, it is not intended that these shall be regarded as limitations upon the scope of the invention, except insofar as included in the accompanying claims.

I claim:

1. A bale of cotton superficially and permanently proof against spark and flash fires and against country damage.

2. A bale of cotton superficially impregnated with boric acid and a non-coloring fixing agent in proportion substantially less than the boric acid.

3. A bale of cotton superficially impregnated with boric acid and a non-coloring fixing agent in a solution slightly acid with mineral acid.

4. A bale of cotton superficially impregnated with boric acid and zinc and stannous sulfates in a solution slightly acid with sulfuric acid.

5. The process of rendering a cotton bale permanently proof against spark and flash fires, which comprises superficially impregnating the bale with boric acid and a non-coloring fixing agent in proportion substantially less than the boric acid.

6. The process of rendering a cotton bale permanently proof against spark and flash fires, which comprises superficially impregnating the bale with boric acid and zinc and stannous sulfates in the presence of a trace of sulfuric acid.

7. A solution for superficially impregnating cotton bales which comprises boric acid and a non-coloring fixing agent in proportion substantially less than the boric acid.

8. A solution for superficially impregnating cotton bales which comprises boric acid, a non-coloring fixing agent and a trace of mineral acid.

9. A solution for superficially impregnating cotton bales which comprises boric acid, zinc and stannous sulfates and a trace of mineral acid.

10. A solution for superficially impregnating cotton bales which comprises 2-2/3 pounds boric acid and 1/50th pound of zinc and stannous sulfates per 100 gallons, together with a trace of sulfuric acid.

11. A paste for producing a solution for superficially and permanently impregnating cotton bales comprising 66-2/3 per cent of boric acid containing a trace of sulfuric acid, 0.5 per cent of zinc and stannous sulfates and water.

12. A material for superficially impregnating cotton bales containing water and solids comprising boric acid and a non-coloring fixing agent in proportion up to 2.25% of the boric acid.

13. A material for superficially impregnating cotton bales containing water and solids comprising boric acid and zinc and stannous sulfates, the combined proportion of the latter being 0.75% of the boric acid.

HENRY V. HALEY.